United States Patent [19]

Haraden

[11] 4,147,497
[45] Apr. 3, 1979

[54] HAND-OPERABLE SIGNAL DEVICE USING PERCUSSIVELY-IGNITABLE FLASHLAMPS

[75] Inventor: Thomas Haraden, Ipswich, Mass.
[73] Assignee: GTE Sylvania Incorporated, Danvers, Mass.
[21] Appl. No.: 756,928
[22] Filed: Jan. 4, 1977
[51] Int. Cl.² .............................................. F21K 5/02
[52] U.S. Cl. ................................... 431/359; 431/361; 362/11
[58] Field of Search ............................ 431/92, 93, 97; 240/1.3

[56] References Cited

U.S. PATENT DOCUMENTS

| 3,734,678 | 5/1973 | Liepert | 431/93 |
|---|---|---|---|
| 3,735,111 | 5/1973 | Shaffer | 431/93 |
| 3,753,390 | 8/1973 | Hough et al. | 431/93 |
| 3,765,079 | 10/1973 | Pfefferle et al. | 431/93 |
| 3,776,686 | 12/1973 | Anderson et al. | 431/93 |
| 3,980,421 | 9/1976 | Heeman et al. | 431/93 |
| 4,070,145 | 1/1978 | Hall, Jr. et al. | 431/93 |
| 4,076,488 | 2/1978 | Hall, Jr. | 431/93 |

Primary Examiner—Henry C. Yuen
Attorney, Agent, or Firm—Lawrence R. Fraley

[57] ABSTRACT

A signal device which utilizes a plurality, e.g., ten, of percussively-ignitable flashlamps and is designed for single-handed operation. The device also comprises a body member which includes a handle portion and a support portion for having the lamps mounted thereon. A trigger moves in response to manual actuation between the handle and support portions in a reciprocal manner to in turn actuate the device's firing mechanism located within the support portion of the body. The firing mechanism, e.g. ratchet and helical torsion spring, in turn selectively fires each of the lamps in response to this reciprocal movement.

9 Claims, 4 Drawing Figures

HAND-OPERABLE SIGNAL DEVICE USING PERCUSSIVELY-IGNITABLE FLASHLAMPS

CROSS REFERENCE TO RELATED APPLICATIONS

Two applications, listed in the Patent and Trademark Office under Ser. Nos. 756,926 and 756,927, were filed Jan. 4, 1977. Ser. No. 756,927 defines a flashlamp assembly and selective firing mechanism therefor, a primary feature of which is the utilization of a slidable carriage upon which is positioned the assembly's firing mechanism, e.g. helical torsion spring. Ser. No. 756,926 is an application for design for a flashlamp assembly.

Another application, filed June 14, 1976 and now U.S. Pat. No. 4,076,488 (H. H. Hall et al), is assigned to the assignee of this invention and defines a flashlamp assembly which employs a spring-loaded ratchet bar and a slidable member, e.g. helical torsion spring, which fires the assembly's percussive flashlamps during movement of the ratchet bar.

Two additional applications filed June 14, 1976 are now U.S. Pat. Nos. 4,070,145, (H. H. Hall et al) and 4,055,759 (Bouchard et al), and are also assigned to the same assignee as the present invention. Both of these patents describe percussive flashlamp signal devices wherein each of the lamps has a preenergized striker, e.g. torsion spring, associated therewith.

BACKGROUND OF THE INVENTION

The present invention relates to signal devices and more particularly to signal devices which utilize percussive-ignitable flashlamps. Even more particularly, the invention relates to devices of this variety which are operable by hand.

The flashlamp assemblies and signal devices defined in the aforementioned U.S. Pat. Nos. 4,055,759, 4,070,145 and 4,076,488 are all operable by hand. As described therein, operation is accomplished by grasping the periphery of the assembly's supportive structure with at least one hand and depressing an associated movable plunger, button, slide etc. to selectively fire the lamps within the structure.

Regardless of whether the above devices were capable of being operated using one or two hands, firing of the flashlamps required the operator to position at least one hand substantially about the device's structure and therefore very close to the flashlamps located therein. The result was at least a partial blockage of the emitted light. It was additionally possible for the temperature of this part of the device to become uncomfortably warm to the operator's hand as a result of the heat generated by the lamps.

It is believed therefore that a percussive flashlamp signal device which is capable of being operated single-handedly and which permits positioning of the operator's hand at a distance from the device's lamps would constitute an advancement in the art.

OBJECTS AND SUMMARY OF THE INVENTION

It is therefore a primary object of the present invention to provide a signal device which utilizes percussively-ignitable flashlamps and is capable of being operated single-handedly.

It is a further object of the invention to provide a signal device of the nature described wherein operation of the device is possible without requiring positioning of the operator's hand in the immediate vacinity of the device's flashlamps.

The above objects are achieved in accordance with one aspect of the invention by provision of a signal device which comprises an elongated body member including handle and support portions, a number of percussively-ignitable flashlamps positioned on the body's support portion, and a trigger member movably oriented on the body substantially between the handle and support portions and adapted for reciprocative movement therebetween. The device's firing mechanism, located within the body's support portion, is operatively connected to the trigger and selectively fires the flashlamps in response to the trigger's reciprocative movement.

DETAILED DESCRIPTION OF THE PREFERRED EMBODIMENTS

For a better understanding of the present invention together with other and further objects, advantages and capabilities thereof, reference is made to the following disclosure and appended claims in connection with the above-described drawings.

Figure 1:
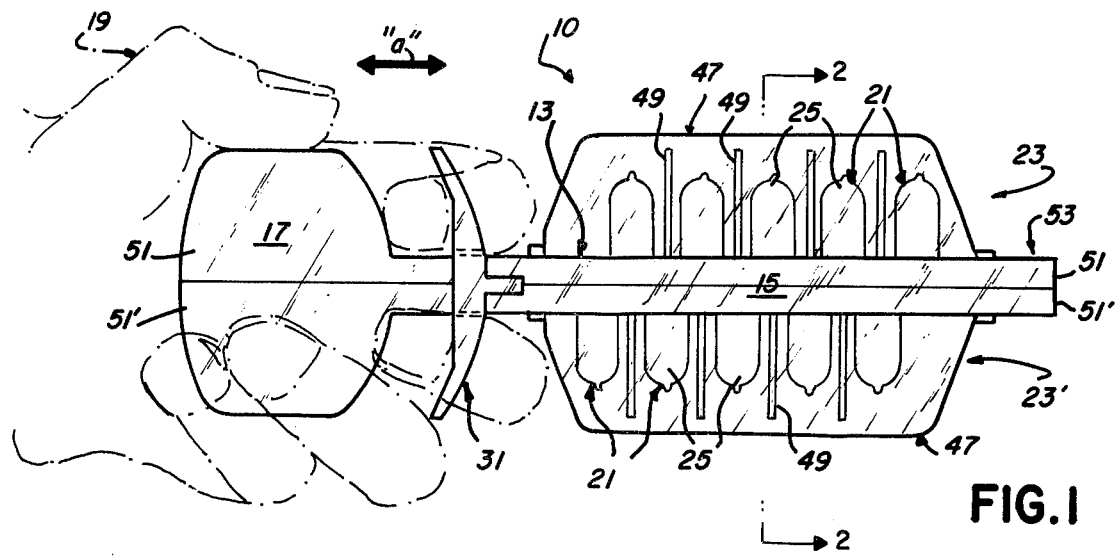
FIG. 1 is a side elevational view of a signal device in accordance with a preferred embodiment of the invention.

With particular reference to FIG. 1, there is shown a signal device 10 in accordance with a preferred embodiment of the invention. Device 10 comprises an elongated body member 13 which includes a support portion 15 and handle portion 17 spaced an established distance from the support. As shown, handle 17 is adaptable for fitting within the palm of an operator's hand 19 (phantom) and is thus capable of being operated single-handedly.

Figure 2:
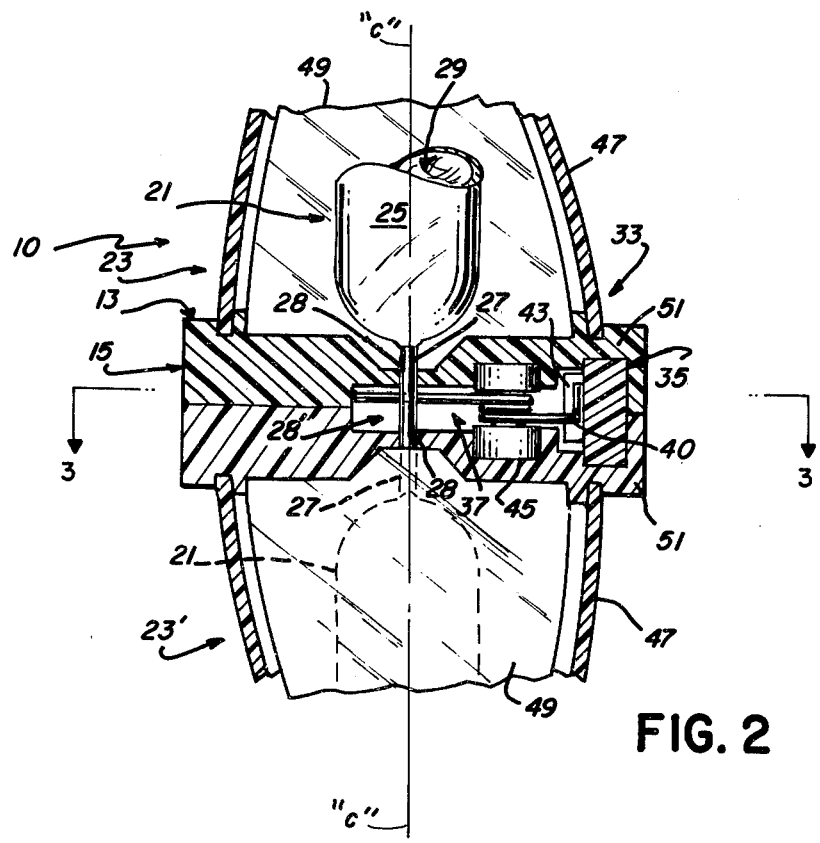
FIG. 2 is a partial end elevational view, in section, as taken along the line 2—2 in FIG. 1.

Device 10 includes a plurality of percussively-ignitable flashlamps 21 preferably mounted in two separate rows (23 and 23') on opposing sides of support portion 15. The preferred number of lamps in each row is five, thus providing device 10 with a total of ten illuminating components. Examples of flashlamps which are suitable for use in the instant invention are described in U.S. Pat. Nos. 3,535,063 (Anderson et al), 3,586,470 (Brown), 3,645,663 (Shaffer), and 3,918,883 (Armstrong et al). Such lamps typically include a light-transmitting glass envelope containing therein a quantity of combustible material, e.g. zirconium foil, and a combustion-supporting atmosphere. A metallic primer tube projects from the envelope and contains therein a quantity of fulminating material. Deformation of the tube results in deflagration of the fulminating material up through the tube and subsequent ignition of the combustible material. Accordingly, each of the flashlamps of the invention is shown as including a light-transmitting envelope 25 and a primer tube 27 (FIG. 2) projecting therefrom. Support 15 includes a plurality of openings 28 therein with at least one of the openings accommodating a respective one of the primers 27. It is shown in FIG. 2 that two spaced openings 28 are provided for a singular primer 27, this spaced relationship in turn permitting an open region 28' to be located between the respective portions of support 15 which include openings 28 therein. As illustrated in the drawings, the primers 27 of the lamps 21 in rows 23 and 23' are alternately located within support 15 and preferably occupy a common plane "c—c" (FIG. 2). Within envelope 25 of each lamp 21 there is shown a quantity of the aforedescribed combustible filamentary material 29, e.g. zirconium foil.

In the present invention, the lamps 21 in opposing rows 23 and 23' are selectively fired in an alternating pattern from one end of support 15 to the other. Preferably, the lamps positioned in the area of support 15 farthest from the operator's hand 19 are fired first. It is of course understood that the aforedescribed firing pattern represents one of several which could be successfully utilized in the present invention.

Figure 3:
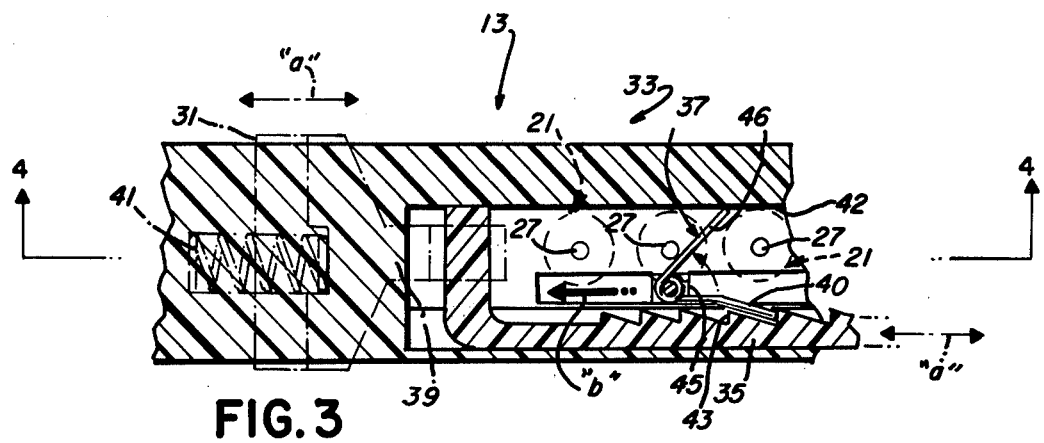
FIG. 3 is a partial plan view, in section, as taken along the line 3—3 in FIG. 2.
Figure 4:
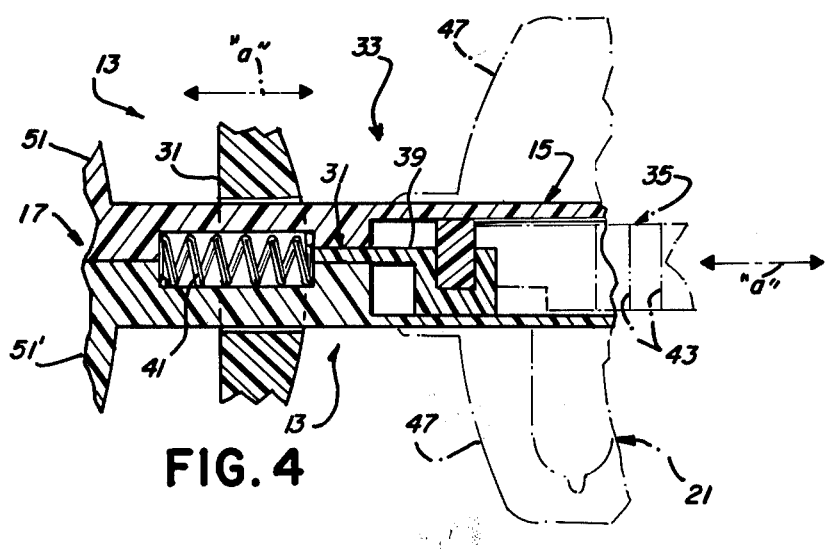
FIG. 4 is a partial side elevational view, in section, as taken along the line 4—4 in FIG. 3.

Device 10 further comprises a trigger member 31 which is movably oriented on body 13 between the support and handle portions 15 and 17, respectively. As will be described, trigger 31 moves in a reciprocal manner (direction "a") between portions 15 and 17 in response to actuation by at least one of the fingers on the hand 19 of the operator. In the embodiment of FIG. 1, two fingers are used with each located on opposing sides of the device's body member 13. Operatively joined to trigger 31 is a firing mechanism 33 (FIGS. 2-4) which is located within support 15 relative to each of the lamps 21 and adapted for selectively firing each in response to the reciprocal movement of the trigger. This reciprocal movement is achieved in the present invention by providing firing mechanism 33 with an elongated ratchet member 35 and a resilient striking mechanism, e.g. helical torsion spring 37. Ratchet 35 is shown as being operatively joined to trigger 31 through a connecting arm 39 which forms part of the trigger. Because arm 39 is spring-loaded (spring 41) within body 13, it is understood that ratchet 35 is therefore also spring-biased. That is, ratchet 35 and trigger 31 are both biased in a direction away from the device's handle 17. Accordingly, manual actuation of the trigger is required to force both of these components toward the handle. This movement also causes spring 37 to move toward handle 17 (direction "b" in FIG. 3) and sequentially fire each of the lamps 21 by striking the primers 27 extending therefrom. Spring 37 is in engageable contact through segment 40 with teeth 43 on ratchet 35 and will slide thereover during return movement of the ratchet in a direction opposite to direction "b". Spring 37 is designed to move three teeth at a time along ratchet 35 in response to each reciprocal movement of trigger 31. Spring 37 is prevented from moving in a direction opposite to direction "b" during the return (biased) movement of ratchet 35 due to the positive, locking engagement of wall 42 by the end of the spring's striking arm 46 prior to said return movement. It can further be understood from the above description that each of the primer tubes 27 of a fired lamp serve to re-tension spring 37 prior the the next firing sequence. Alignment of spring 37 within support 15 during the above-described motion is enhanced by positioning the spring on a carriage 45 which slidably moves within the support in a direction substantially parallel to the movement of ratchet 35.

Device 10 may also include a light-transmitting cover means 47 which is positioned on support 15 and serves to cover the lamps 21 mounted therein. It is also preferred that cover 47 be hermetically sealed to the support to prevent moisture from entering the respective flashlamp compartments. Device 10 may also include a plurality of light shielding members 49, each of which is positioned on support 15 between a respective pair of lamps 21 to prevent sympathetic ignition of these members.

It is preferred that body member 13 be of two-piece construction to facilitate assembly of device 10. Each of these pieces are represented in the drawings at FIGS. 1, 2 and 4 as numerals 51 and 51'. Two-piece construction enhances assembly of device 10 by simplifying the procedures for positioning many of the device's internal components, e.g. ratchet 35, spring 37, carriage 45, and biasing spring 41. Device 10 may also include an opening 53 therein which would permit affixing a lanyard (not shown) or similar article to the device. Opening 53 could also be used to suspend device 10 from a suitable hanger such as a hook or nail.

As defined in the foregoing description, device 10 relies exclusively on mechanical actuation to provide ignition of the devices flashlamps, thus excluding the necessity for electrical circuitry and components. This feature is particularly advantageous with regard to marine and similar environments which can adversely affect such articles. Still another feature which can easily be added to device 10 to make the device more adaptable to marine use is the provision of styrofoam (not shown) or similar material within handle 17. It is understood that the primary function of such material would be to provide device 10 with added bouyancy. Handle 17 would of course be hollow to accommodate this material. A hollow handle could also provide storage for a dye or similar material which could be used in marine applications as a second signaling feature.

Thus there has been shown and described a signal device capable of being operated single-handedly and which provides several highly intense illuminations when actuated. The device as defined assures a means whereby the operator's hand is spacedly positioned from the device's lamps to reduce the opportunity for blockage of emitted light from the device during firing. The device is also particularly suited to marine and similar potentially harmful environments. It is preferred that plastic be used for all the components of device 10, excluding springs 37 and 41 (which are metallic) and flashlamps 21. The preferred materials for lamps 21 have been previously defined.

While there have been shown and described what are at present considered the preferred embodiments of the invention, it will be obvious to those skilled in the art that various changes and modifications may be made therein without departing from the scope of the invention as defined by the appended claims.

What is claimed is:

1. A hand-operable signal device comprising:
   an elongated body member including a support portion and a handle portion;
   a plurality of percussively-ignitable flashlamps mounted on said support portion;
   a trigger member movably oriented on said elongated body member substantially between said support and handle portions and adapted for reciprocal movement therebetween; and
   a firing mechanism located within said support portion relative to each of said percussively-ignitable flashlamps, said firing mechanism operatively joined to said trigger member for selectively firing each of said flashlamps in response to said reciprocal movement of said trigger member between said support and handle portions.

2. The signal device according to claim 1 wherein said percussively-ignitable flashlamps are mounted in two separate rows on opposing sides of said support member.

3. The signal device according to claim 2 wherein the number of flashlamps within each of said rows is five.

4. The signal device according to claim 2 wherein said rows of flashlamps on opposing sides of said support member are parallel.

5. The signal device according to claim 1 further including light-transmitting cover means positioned on said support portion of said body member for covering said flashlamps.

6. The signal device according to claim 1 further including a plurality of light shielding members, each of said members positioned on said support portion of said body member between a respective pair of said flashlamps.

7. The signal device according to claim 1 wherein each of said percussively-ignitable flashlamps includes a light-transmitting envelope and a primer tube projecting therefrom and said support member contains a plurality of spaced openings therein each for accommodating one of said primer tubes.

8. The signal device according to claim 7 wherein said firing mechanism comprises an elongated ratchet member operatively joined to said trigger member and a resilient striking mechanism in engageable contact with said ratchet member for selectively striking each of said projecting primer members of said flashlamps in response to said reciprocal movement by said trigger member.

9. The signal device according to claim 1 wherein said elongated body member is of two-piece construction.

* * * * *